United States Patent [19]
Ogawa et al.

[11] Patent Number: 5,916,980
[45] Date of Patent: Jun. 29, 1999

[54] POLYCARBONATE RESIN COMPOSITION

[75] Inventors: Noriyoshi Ogawa; Jun Tajima, both of Osaka; Mitsuhiro Takarada; Masaki Tanaka, both of Gunma, all of Japan

[73] Assignees: Mitsubishi Gas Chemical Company, Inc.; Shin-Etsu Chemical Co., Ltd., both of Tokyo, Japan

[21] Appl. No.: 08/943,158

[22] Filed: Oct. 3, 1997

[30] Foreign Application Priority Data

| Oct. 3, 1996 | [JP] | Japan | 8-281904 |
| Oct. 3, 1996 | [JP] | Japan | 8-281905 |
| Aug. 6, 1997 | [JP] | Japan | 9-224257 |
| Aug. 6, 1997 | [JP] | Japan | 9-224258 |

[51] Int. Cl.$^6$ ................................................ C08G 64/00
[52] U.S. Cl. ............................ 525/464; 528/28; 528/30; 528/196
[58] Field of Search ............................... 528/196, 28, 30; 525/464

[56] References Cited

FOREIGN PATENT DOCUMENTS

| 3-79626 | 4/1991 | Japan | C08G 64/06 |
| 5-140461 | 6/1993 | Japan | C08L 83/10 |
| 5-155997 | 6/1993 | Japan . | |
| 5-155999 | 6/1993 | Japan | C08G 64/08 |
| 07165897 | 6/1995 | Japan | C08G 64/08 |
| 07258398 | 10/1995 | Japan | C08G 64/08 |

*Primary Examiner*—Terressa Mosley
*Attorney, Agent, or Firm*—Sughrue, Mion, Zinn Macpeak & Seas, PLLC

[57] ABSTRACT

A polycarbonate polymer and resin composition having excellent transparency and abrasion resistance, comprising a mixture of (i) a polycarbonate polymer having a repeating unit having a specific grafted polysiloxane structure, and (ii) from 0 to 20 wt % of a diorganopolysiloxane. The polycarbonate polymer is obtained by reacting (a) a specific polysiloxane compound and (b) a specific bisphenol compound with (c) a carbonate ester forming compound.

10 Claims, 2 Drawing Sheets

POLYCARBONATE RESIN COMPOSITION

FIELD OF THE INVENTION

The polycarbonate resin composition of the present invention comprises a novel polycarbonate polymer having a polysiloxane structural unit, or a mixture of the novel polycarbonate and an ordinary diorganopolysiloxane. The resin composition is useful for molding materials, polymer alloy materials and additives.

BACKGROUND OF THE INVENTION

Description of the Related Art

Most polycarbonate resin produced at present is bisphenol A type polycarbonate which is produced from 2,2-bis(4-hydroxyphenol)propane (bisphenol A) as a raw material.

The bisphenol A type polycarbonate is a well balanced polycarbonate in terms of cost, heat resistance, mechanical strength, etc. Recently, polycarbonates having superior physical properties have been desired with an expansion of polycarbonate use, and polycarbonates having a variety of structures have been developed.

However, there is a need for the development of polycarbonates having even more superior physical properties or specific physical properties.

For example, a siloxane copolymer polycarbonate which is a modified polycarbonate having improved release properties and flowability has been developed (JP-A-50-29695 (the term "JP-A" as used herein means an "unexamined published Japanese patent application"), JP-A-3-079626, JP-A-5-155999, JP-A-7-258398 and JP-A-7-165897).

Furthermore, polycarbonate resin is often used as a composition containing additives, such as a releasing material or a fire retardant, in order to strengthen release properties, flowability, weather resistance, fire retardancy, etc. Especially, when silicone (diorganopolysiloxane) is used as an additive, abrasion resistance and the release property are improved and fire retardancy is obtained, such that the additive is useful for a polycarbonate resin. However, when diorganopolysiloxane is added in a large amount, there is a problem in that the polycarbonate molded article turns muddy-white, and transparency which is a characteristic feature of polycarbonate is decreased. Particularly, even when the resin is dissolved in a good solvent in which the resin is easily dispersed in a homogeneous manner, the resin liquid can become muddy-white and a wet molded article having a good appearance is not obtained.

On the other hand, a resin composition blended from a siloxane block copolymer polycarbonate and an ordinary polycarbonate with the objective of improving fire retardancy, release properties and flowability has been developed (JP-A-55-1660052, JP-A-62-146953, JP-A-5-140461 and JP-A-1-161048).

The above described modified polycarbonate has an improved release property, water repellency, flowability and abrasion resistance, etc., as compared to conventional polycarbonates. However, there is a need for further improvement in abrasion resistance, and the above modified polycarbonate is not satisfactory.

Furthermore, the above described resin composition blended from a siloxane block copolymer polycarbonate and an ordinary polycarbonate is improved with respect to the above described properties. However, its overall properties are not necessarily satisfactory when a diorganopolysiloxane additive is employed.

Therefore, a polycarbonate having improved compatibility with a diorganopolysiloxane additive and a polycarbonate resin which exhibits no loss in transparency and which retains its abrasion resistance and release property has been desired.

The present inventors conducted extensive research in order to solve the above problems of the prior art. As a result, the present inventors discovered a polycarbonate polymer having a repeating unit having a specific grafted polysiloxane structure, to thereby complete the present invention.

SUMMARY OF THE INVENTION

It is therefore an object of the present invention to provide a polycarbonate resin composition for preparing molded articles having excellent transparency, abrasion resistance and release properties.

The above objectives have been achieved by providing a polycarbonate resin composition comprising a mixture of (i) a polycarbonate polymer having a polysiloxane structural unit obtained by reacting (a) a polysiloxane compound of the formula (A):

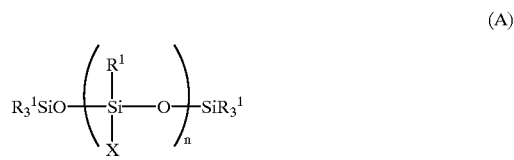

(A)

wherein $R^1$ each independently represents a group, which may have a substituent, selected from the group consisting of an alkyl group having 1 to 7 carbon atoms, an aryl group having 6 to 12 carbon atoms, an alkenyl group having 2 to 7 carbon atoms, an alkoxy group having 1 to 7 carbon atoms and an aralkyl group having 7 to 17 carbon atoms, X represents $R^1$ and/or an organic group (M) having a hydroxyphenyl group, the number of M groups per molecule of the compound of formula (A) is an average value of from 1 to 3, and n is an average value of from 2 to 1000; and (b) a bisphenol of formula (B):

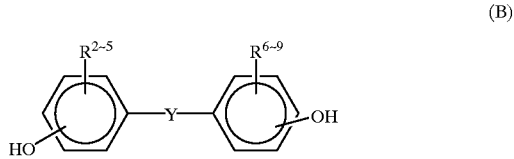

(B)

wherein $R^2$–$R^9$ each independently represents hydrogen, fluorine, chlorine, bromine, iodine, a group, which may have a substituent, selected from the group consisting of an alkyl group having 1 to 7 carbon atoms, an aryl group having 6 to 12 carbon atoms, an alkenyl group having 2 to 7 carbon atoms, an alkoxy group having 1 to 7 carbon atoms and an aralkyl group having 7 to 17 carbon atoms, and Y represents:

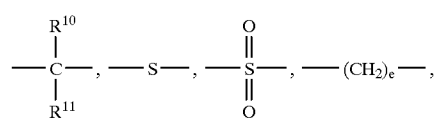

wherein $R^{10}$ and $R^{11}$ each independently represents hydrogen, a group, which may have a substituent, selected from the group consisting of an alkyl group having 1 to 7 carbon atoms and an alkenyl group having 2 to 7 carbon atoms, an alkoxy group having 1 to 7 carbon atoms, an aryl group having 6 to 12 carbon atoms, or $R^{10}$ and $R^{11}$ may combine to form a cyclic or a heterocyclic ring, and e represents an integer of from 0 to 20; with (c) a carbonate precursor, and (ii) from 0 to 20 wt % of a diorganopolysiloxane.

DETAILED DESCRIPTION OF THE INVENTION

Figure 1:
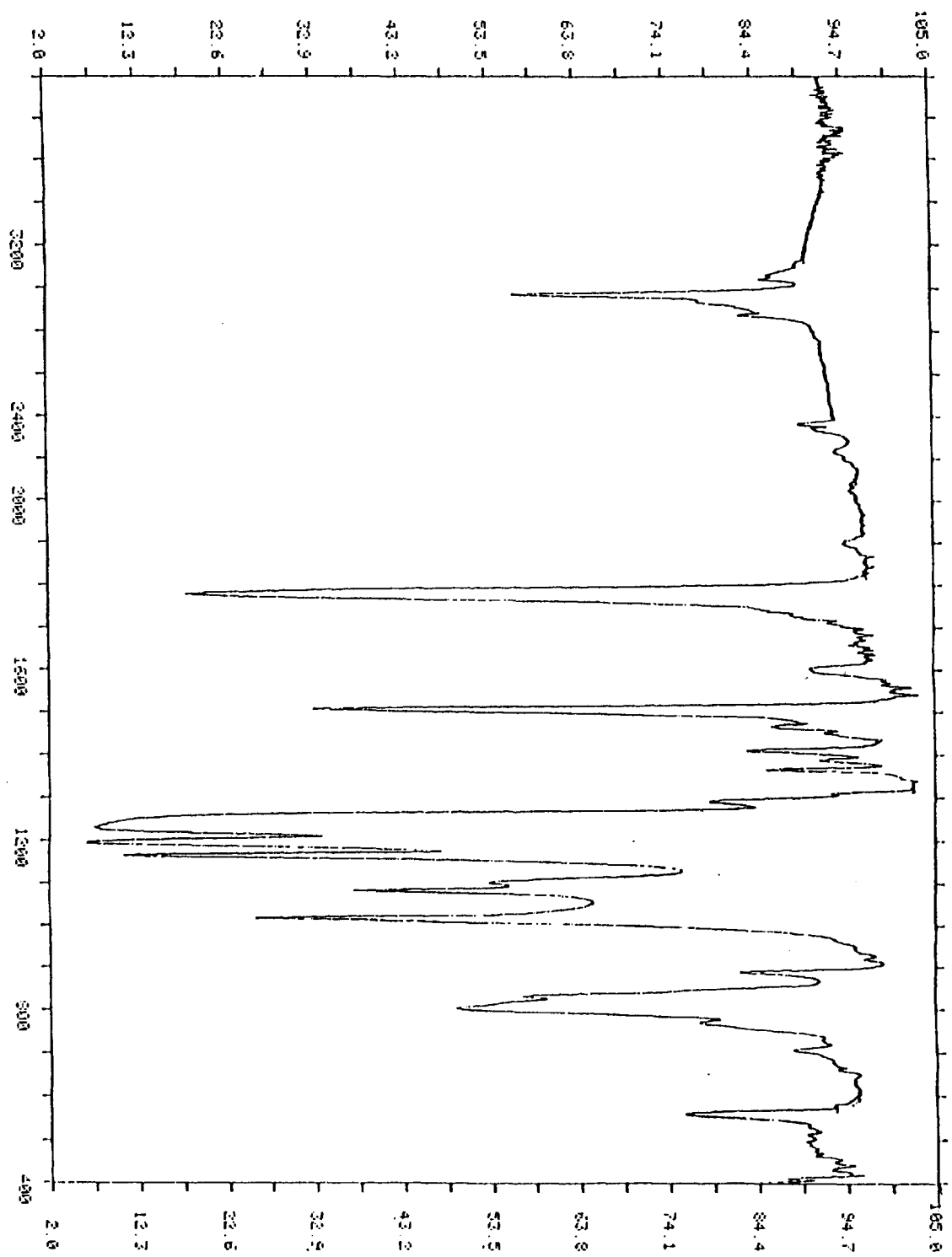
FIG. 1 shows an infrared absorption spectrum of the polymer obtained in Example 1.

The present invention is described in greater detail below.

The polysiloxane compound represented by general formula (A) can be produced by a conventional hydrosilation reaction, such as a method in which a phenol having an unsaturated group and a polysiloxane having a Si-H group are reacted by an addition reaction under a hydrosilation catalyst.

The catalyst used in the hydrosilation may be of a homogeneous type or a heterogeneous type, for example, a platinum complex represented by a chloroplatinate, metal platinum, octacarbonyldicobalt, palladium complex, rhodium complex, etc.

The reaction may be conducted in a solvent in which an unsaturated group-containing phenol is dissolved. Examples thereof include halogenated hydrocarbons such as carbon tetrachloride, chloroform, 1,2-dichloroethane, etc.; aromatic hydrocarbons such as benzene, toluene and xylene; aromatic halogenates such as monochlorobenzene and dichlorobenzene; methyl ethyl ketone, ethyl acetate, 1,4-dioxane, cyclohexanone, etc. Aromatic hydrocarbons such as benzene, toluene and xylene are preferred in view of solubility and combination with the catalyst.

The reaction temperature is preferably from 60 to 150° C.

The Si-H group-containing polysiloxane can be derived from poly(alkyl hydrogen siloxane), poly(aryl hydrogen siloxane), poly(alkyl aryl hydrogen siloxane), for example, poly(methyl hydrogen siloxane), poly(ethyl hydrogen siloxane), poly(phenyl hydrogen siloxane), poly(methyl phenyl hydrogen siloxane), etc. These polysiloxanes can be used in combination with each other.

Furthermore, the polysiloxane compound represented by formula (A) has an average of from one to three phenol groups (hydroxyphenyl groups) per one polysiloxane molecule which are added in the above described reaction. The added hydroxyphenyl group reacts with a carbonate precursor to form a carbonate bond. When the hydroxyphenyl group content averages less than one per one polysiloxane molecule, the amount of non-reactive polysilaxane which does not contain an added hydroxyphenyl group is increased. Furthermore, when the hydroxyphenyl group content averages more than three per one polysiloxane molecule, the polysiloxane becomes a strong branching agent. As a result, a solvent insoluble polycarbonate having a rubber-like three dimensional network structure is produced, and the moldability and handling properties deteriorate.

Furthermore, n preferably has an average value of from 2 to 1,000, most preferably from 3 to 100. When n is less than 2, sufficient polysiloxane properties are not obtained. When n is over 1000, the reactivity with the other phenols is undesirably reduced.

Examples of the phenol having an unsaturated group which is reacted with polysiloxane having the above-described Si-H group include o-allylphenol, eugenol, isoeugenol, p-isopropenylphenol, p-hydroxystyrene, p-allylphenol, 2,6-dimethyl-4-allylphenol, 2-t-butyl-6-(3-t-butyl-2-hydroxy-5-methylbenzyl)-4-methylphenylacrylate, 2-[1-(2-hydroxy-3,5-di-t-pentylphenyl)ethyl]-4,6-di-t-pentylphenylacrylate, methyl p-hydroxycinnamate, 2-hydroxystilbene, 4-(1-butenyl)phenol, etc., and among these, o-allylphenol and eugenol are preferred in view of industrial usefulness and reactivity.

Examples of the polysiloxane compound represented by general formula (A) include the following. However, the present invention should not be construed as being limited thereto.

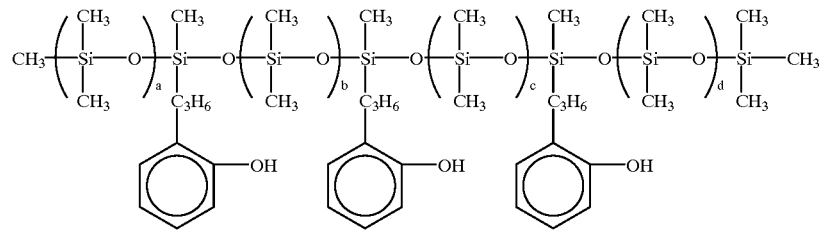

-continued
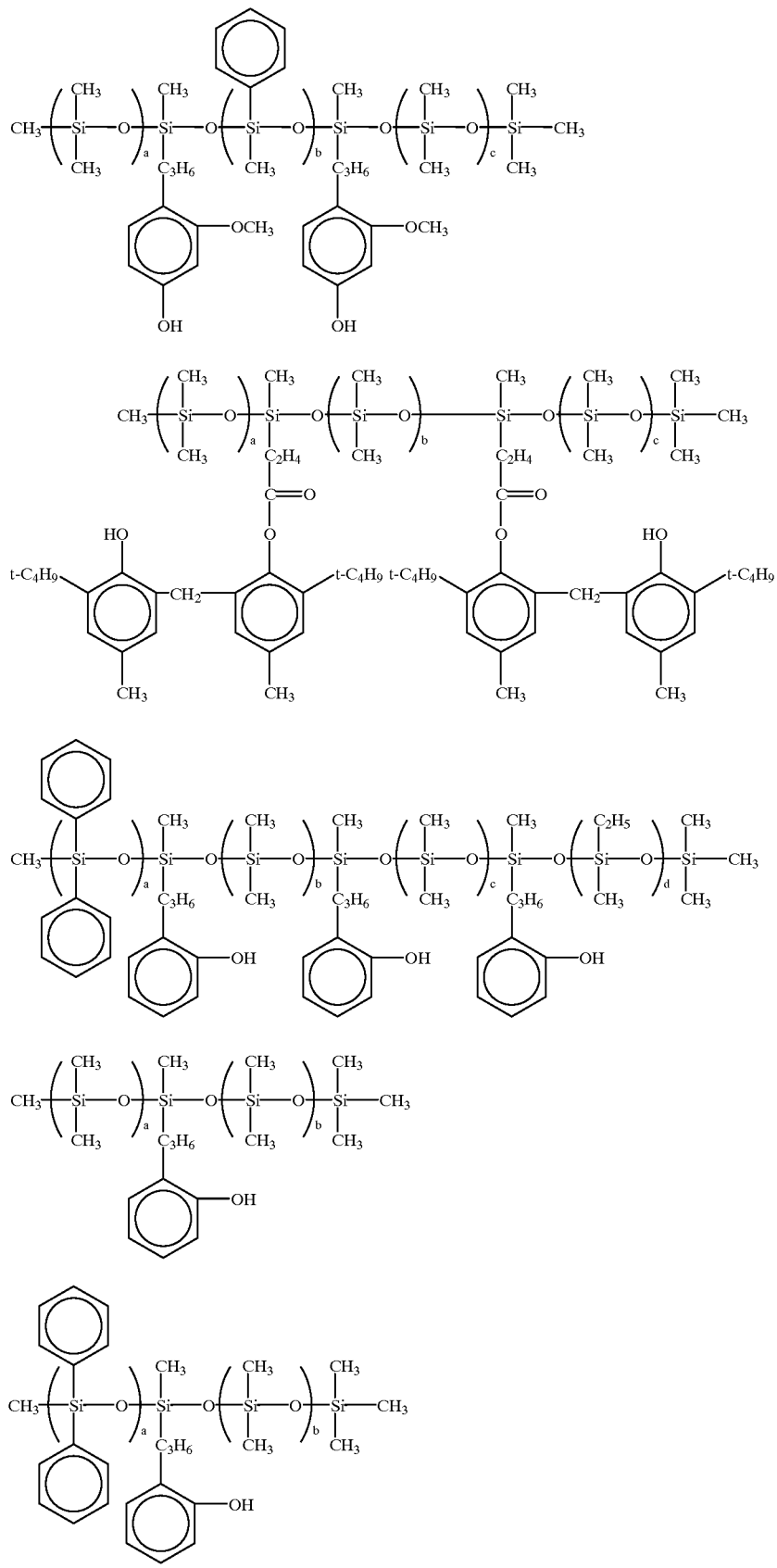

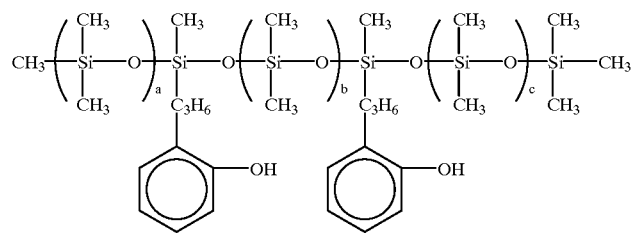
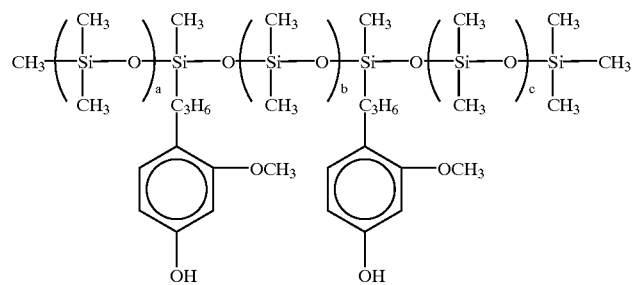
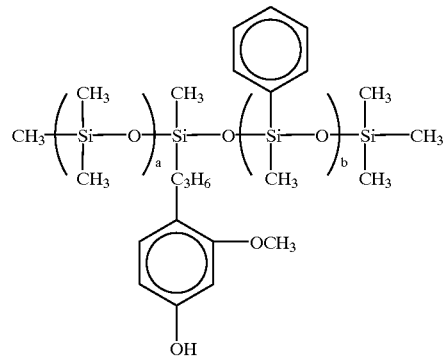
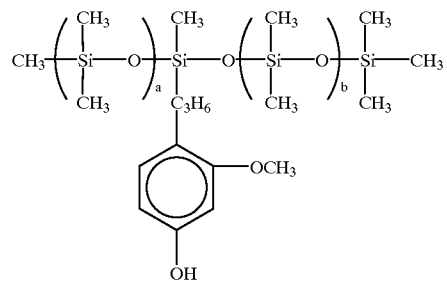
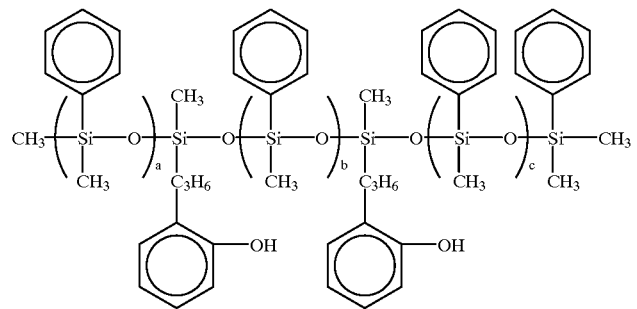

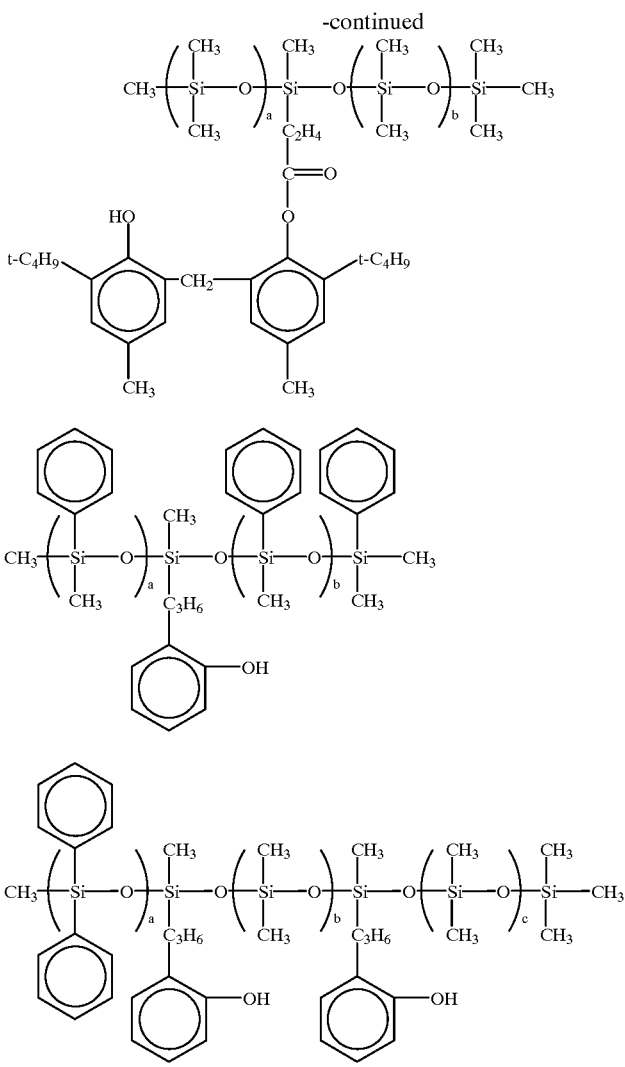

-continued a is an integer of one or more, b, c and d are 0 or an integer of one or more These polysiloxane compounds can be used in combination with each other. The hydroxyphenyl group attached to the polysiloxane is added in a theoretical average of from one to three such groups per one polysiloxane molecule. Therefore, a polysiloxane compound having zero or ten hydroxyphenyl groups, for example, may be present. That is, the expression "an average value of from one to three hydroxyphenyl groups per one polysiloxane molecule" means that the center value of the distribution of the addition number of the hydroxyphenyl group is from one to three. Furthermore, the addition point of the hydroxyphenyl group is not particularly limited, and the hydroxyphenyl group may be attached to any position in a side chain of the compound (A).

Examples of the bisphenol represented by the general formula (B) of the present invention are not limited to the following. These bisphenol compounds can be used in combination with each other.

4,4'-biphenyldiol, bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A; BPA), 2,2-bis(4-hydroxyphenyl)butane, 1,1-bis(4-hydroxyphenyl)cyclohexane (bisphenol Z; BPZ), 2,2-bis(4-hydroxy-3,5-dibromophenyl)propane, 2,2-bis(4 hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, 2,2-bis(4-hydroxy-phenyl)hexafluoropropane, bis(2-hydroxy-3-methylphenyl)methane and 2,2-bis(4-hydroxy-3,5-dimethylphenyl)propane.

And among these, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-1-phenylethane, bis(4-hydroxyphenyl)ether are particularly preferred in view of reactivity.

Examples of the carbonate precursor include phosgene and diaryl carbonate, such as diphenyl carbonate, di-p-tolyl carbonate, phenyl-p-tolyl carbonate, di-p-chlorophenyl carbonate, dinaphthyl carbonate, etc.

Methods of preparing the polymer of the present invention include a conventional method used for preparing a polycarbonate from bisphenol A, such as the direct reaction of a bisphenol with phosgene (the phosgene method), or the transesterification of bisphenols with a diaryl carbonate (the transesterification method).

Among the phosgene method and the transesterification method, the phosgene method is preferred when the heat resistance of the polysiloxane compound of general formula (A) and the reactivity are considered.

In the phosgene method, the amount of the polysiloxane compound of formula (A) is preferably from 0.01 to 20 mol % of the total monomer content (general formula (A)+ general formula (B)) in view of reactivity of the polysiloxane.

When the amount of the polysiloxane compound of formula (A) is less than 0.01 mol %, the polysiloxane properties of the polycarbonate polymer are insufficient, and when the amount of the polysiloxane compound of formula (A) is more than 20 mol %, the viscosity of the copolymer of the present invention is decreased and the objective of a polycarbonate resin is not achieved. Furthermore, in order to make it easy to maintain the interfacial polymerization conditions, the polysiloxane compound of formula (A) is preferably used in an amount of less than 50 wt % of the total monomer content.

In the phosgene method, ordinarily, the polysiloxane compound of general formula (A) and the bisphenol are reacted with phosgene in the presence of a trapping agent of hydrogen chloride and a solvent. Useful trapping agents include, for example, pyridine and alkali metal hydroxides such as sodium hydroxide, potassium hydroxide, etc. The solvent includes, for example, methylene chloride, chloroform, chlorobenzene, xylene, etc.

In order to accelerate the condensation polymerization reaction, a catalyst such as a tertiary amine, e.g., triethylamine or a quaternary ammonium salt, is preferably used. Furthermore, in order to control the polymerization degree, the reaction is preferably carried out by adding a molecular weight modifier such as phenol or p-tert-butylphenol. Furthermore, an antioxidant such as sodium sulfite or sodium dithionite and a branching agent, such as 1,3,5-trihydroxybenzene and 2,3-dihydro-2 oxa-3,3-di(4-hydroxyphenyl)indole, etc., may be added in a small amount.

The reaction temperature is ordinarily from 0 to 150° C., preferably from 5 to 40° C.

The reaction time depends on the reaction temperature, and is ordinarily from 0.5 minute to 10 hours, preferably from 1 minute to 2 hours.

Furthermore, the reaction system is preferably maintained at a pH of over 10 during the reaction.

On the other hand, in the transesterification method, the polysiloxane compound of general formula (A), the bisphenol of general formula (B) and diaryl carbonate are mixed and reacted under vacuum and at high temperature. The reaction is ordinarily carried out at a temperature of from 150° C. to 350° C., preferably from 200 to 300° C. Further, the reaction vacuum pressure is preferably 1 mmHg or less at the end of the reaction, and phenols derived from diaryl carbonate which are bi-products of the transesterification reaction are distilled out of the reaction system. The reaction time, which depends on the reaction temperature or the vacuum pressure, is ordinarily from 1 to 4 hours. The reaction is preferably carried out under an atmosphere of an inert gas, such as nitrogen or argon gas. Furthermore, the reaction may be carried out by adding the above described molecular weight modifier, antioxidant and branching agent, as needed.

The diorganopolysiloxane which may be added to the polycarbonate polymer in the resin composition of the present invention includes, for example, polydialkylsiloxane, polydiarylsiloxane, polyalkylarylsiloxane, etc., and more specifically, polydimethylsiloxane, polydiethylsiloxane, polydiphenylsiloxane, polymethylphenylsiloxane, etc.

These diorganopolysiloxane compounds can be used in combination with each other.

The diorganopolysiloxane has a number-average molecular weight of 200 to 100,000, preferably from 350 to 10,000. A diorganopolysiloxane content of 0 to 20 wt % is preferred for providing both the properties of the diorganopolysiloxane and transparency. When the amount is over 20 wt %, the transparency is reduced.

The diorganopolysiloxane may be blended into the to polycarbonate polymer during preparation of the polycarbonate, or may be blended into a polycarbonate resin liquid, or into a polycarbonate resin powder or into a polycarbonate polymer heat melt. The method in which the diorganopolysiloxane is blended during preparation of polycarbonate polymer is preferred because is the dispersion property is good, and this method is most effective for improving transparency.

The polycarbonate resin composition of the present invention may be molded by a conventional molding method such as extrusion molding, injection molding, blow molding, compression molding and wet molding. To facilitate molding, the intrinsic viscosity [$\eta$] is preferably 2.0 (dl/g) or less, and in order to achieve sufficient mechanical strength, the intrinsic viscosity [$\eta$] is preferably 0.3 (dl/g) or more. Especially, a film molded article prepared by wet molding employing the polycarbonate resin composition of the present invention provides all of the slip properties, water retardancy, transparency and mechanical strength of polycarbonate in good balance.

EXAMPLES

Hereinafter, the present invention is explained in greater detail below by reference to the following Examples. However, these Examples should not be construed as limiting the scope and spirit of the invention.

Example 1

Into 600 ml of 8.8% (w/v) sodium hydroxide, 91.2 g of 2,2 bis(4-hydroxyphenyl)propane (BPA) and 0.5 g of sodium dithionite were added and dissolved.

Into this mixture, 500 ml of methylene chloride and 1.44 g of p-tert-butylphenol were added and agitated. While maintaining the temperature at 15° C., 51 g of phosgene was bubbled Into the reaction mixture over a period of 60 minutes.

After completing the phosgene addition, 13.2 g of the polysiloxane compound (Sil) having the following structure

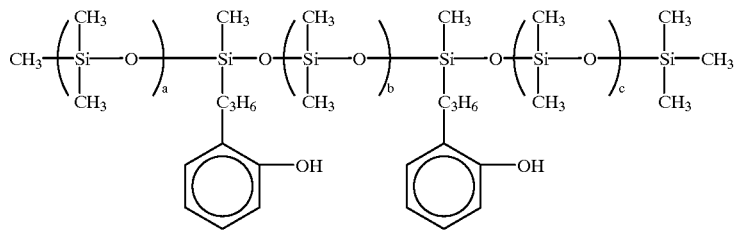

a+b+c≈38, average of 2 phenol groups per molecule was added to the reaction liquid and vigorously agitated to emulsify the reaction liquid. After the emulsification, 0.2 ml of triethylamine was added, and the mixture was agitated for about one hour and polymerized.

The polymerization liquid was separated into a water phase and an organic phase. The organic phase was neutralized with phosphoric acid, and water washing was repeated until the separating washed water became neutral. Then, the resin liquid was dropped into water warmed to 45° C., and the polymer was granulated while removing the solvent. The granules were filtered and then dried to obtain a powdered polymer.

The polymer had an intrinsic viscosity [η] of 0.89 dl/g, in a methylene chloride solution at a concentration of 0.5 g/dl and at a temperature of 20° C.

The polymer thus obtained was analyzed by infrared absorption spectroscopy. As a result, absorption by a carbonyl group was observed at 1770 cm$^{-1}$, and absorption by an ether bond was observed at 1240 cm$^{-1}$, to thereby confirm the presence of a carbonate bond. Furthermore, at 3650–3200 cm$^{-1}$, absorption by hydrogen oxide was almost not observed, and a peak at 1100–1020 cm$^{-1}$ from siloxane was confirmed.

Furthermore, analysis by X-ray fluorescence (Cr globe) confirmed that the polymer contained silicon.

Thus, this polymer was a polycarbonate polymer having the following repeating units as main components.

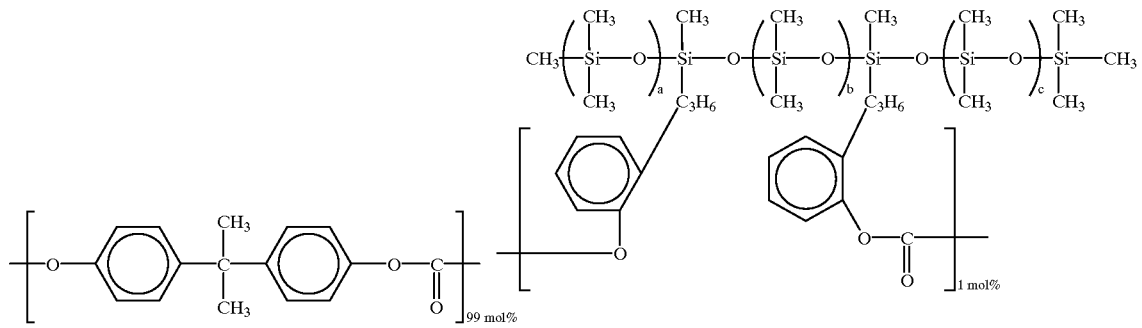

Example 2

The same procedures were conducted as in Example 1, except that 13.2 g of a polysiloxane compound (Si2) having the following structure

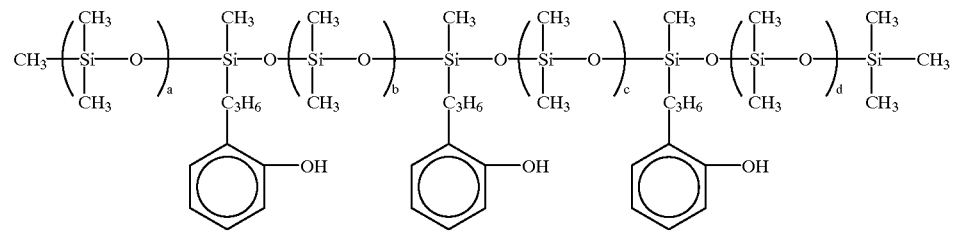

a+b+c+d≈37, average of 3 phenol groups per molecule was used as a main component, and the amount of the p-tertbutylphenol was changed to 2.0 g.

The polymer thus obtained had an intrinsic viscosity [η] of 0.59 dl/g.

Analysis by infrared absoprtion spectroscopy and X-ray fluorescence confirmed that this polymer was a polycarbonate

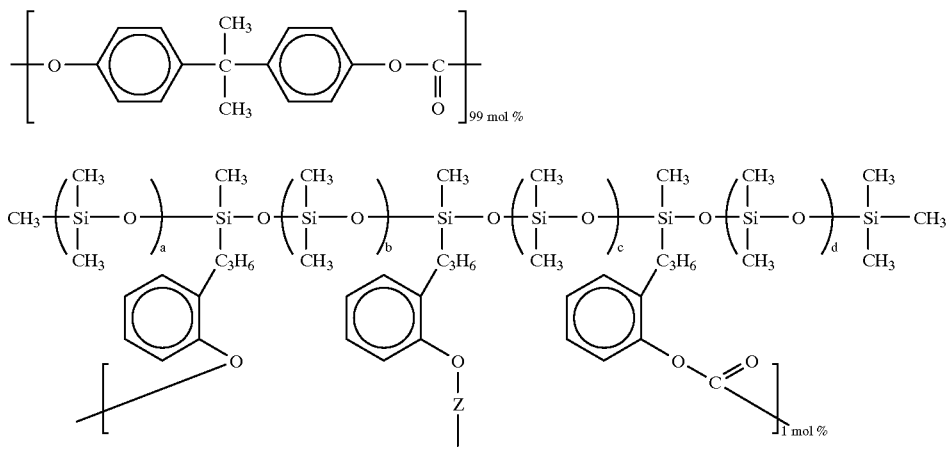

Example 3    Z = direct bond or C═O

The same procedures were conducted as in Example 1, except that 18.4 g of a polysiloxane compound (Si3) having the following structure

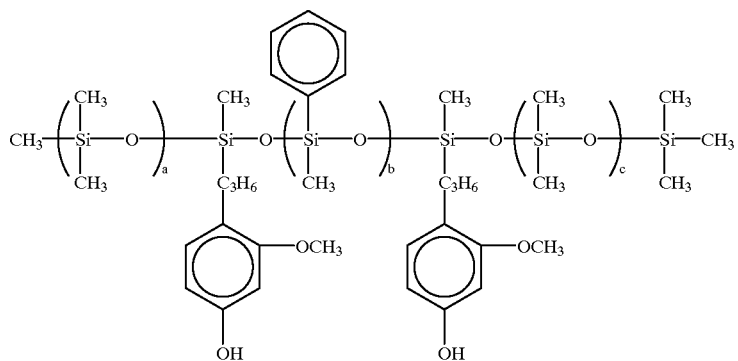

b≈20, a+c≈18, average 2 phenol groups per molecule was used as a main component.

The polymer thus obtained had an intrinsic viscosity [η] of 0.85 dl/g.

Analysis by infrared absorption spectroscopy and X-ray fluorescence confirmed that this polymer was a polycarbonate polymer having the following repeating units as main components.

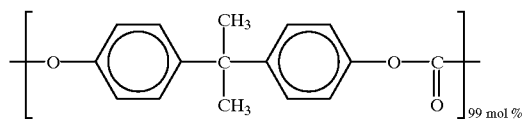

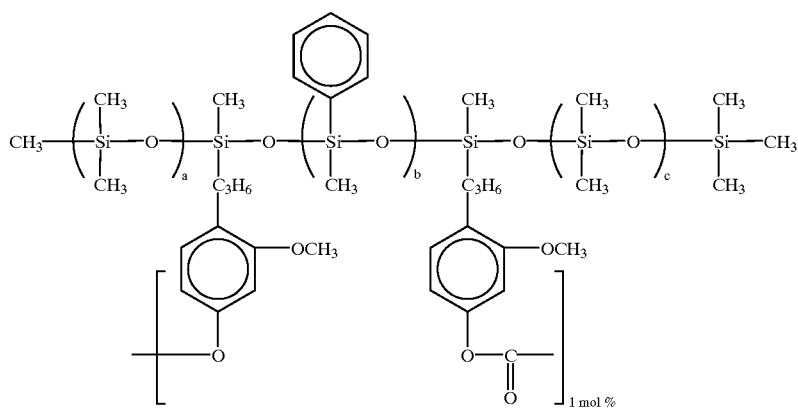

Example 4

The same procedures were conducted as in Example 1, except that 25 g of a polysiloxane compound (Si4) having the following structure

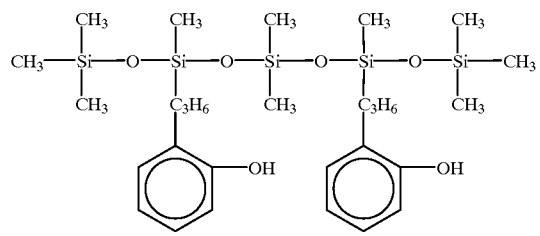

was used as a main component, and the amount of phosgene was changed to 52 g.

The polymer thus obtained had an intrinsic viscosity [η] of 0.76 dl/g.

Analysis by infrared absorption spectroscopy and X-ray fluorescence confirmed that this polymer was a polycarbonate polymer having the following repeating units as main components.

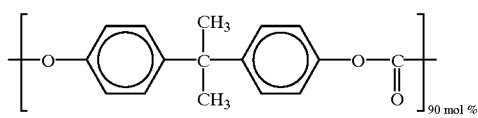

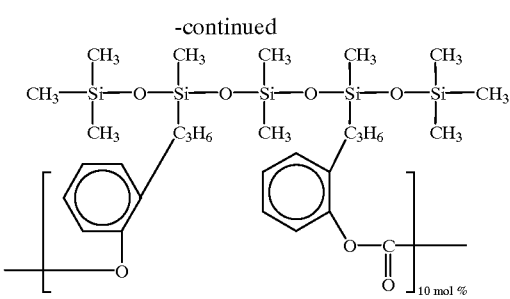

Example 5

The same procedures were conducted as in Example 1, except that 107.2 g of 1,1-bis(4-hydroxyphenyl)cyclohexane was used instead of 91.2 g of 2,2-bis(4-hydroxyphenyl)propane., The polymer thus obtained had an intrinsic viscosity [η] of 0.77 dl/g.

Analysis by infrared absorption spectroscopy and X-ray fluorescence confirmed that this polymer was a polycarbonate polymer having the following repeating units-as main components.

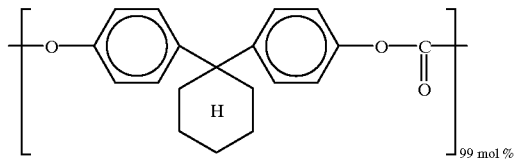

-continued

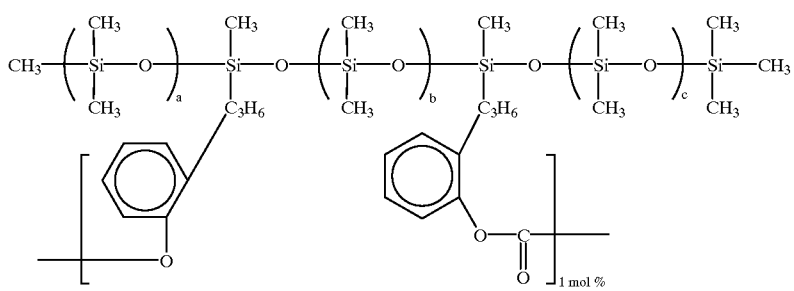

Example 6

The same procedures were conducted as in Example 1, except that 102.4 g of 2,2-bis(3-methyl-4-hydroxyphenyl) propane (DMBPA) was used instead of 91.2 g of 2,2-bis(4-hydroxyphenyl)propane, and the amount of p-tertbutylphenol was changed to 3.6 g and the amount of phosgene was changed to 53 g.

The polymer thus obtained had an intrinsic viscosity [η] of 0.30 dl/g.

Analysis by infrared absorption spectroscopy and X-ray fluorescence confirmed that this polymer was a polycarbonate polymer having the following repeating units as main components.

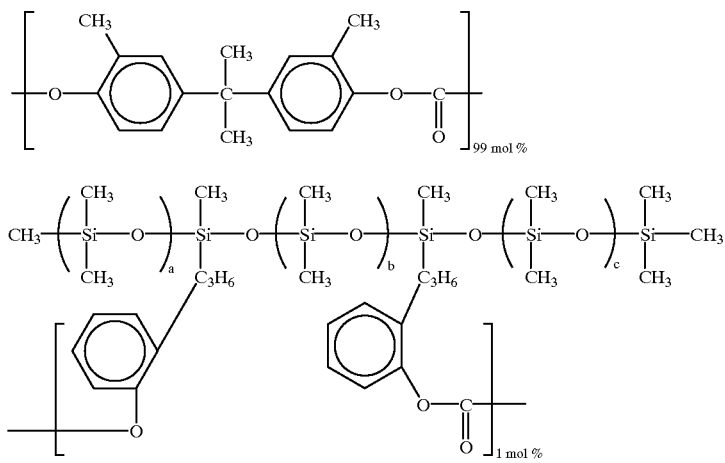

Example 7

The same procedures were conducted as in Example 1, except that 58 g of 1,1-bis(4-hydroxyphenyl)-1-phenylethane and 40.4 g of bis(4-hydroxyphenyl)ether were used instead of 91.2 g of 2,2-bis(4-hydroxyphenyl)propane.

The polymer thus obtained had an intrinsic viscosity [η] of 0.86 dl/g.

Analysis by infrared absorption spectroscopy and X-ray fluorescence confirmed that this polymer was a polycarbonate polymer having the following repeating units as main components.

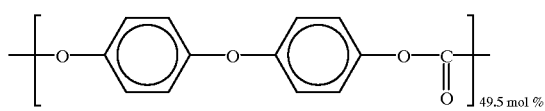

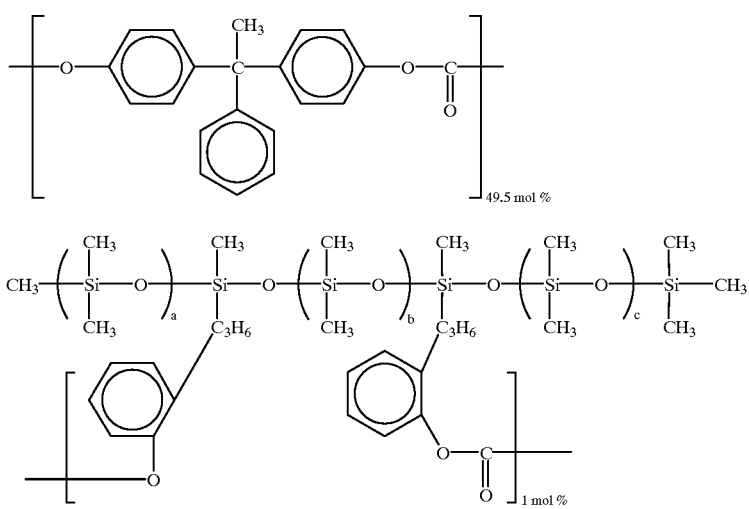

Example 8

Into 600 ml of 8.8% (w/v) sodium hydroxide, 91.2 g of 2,2-bis(4-hydroxyphenyl)propane (BPA) and 0.5 g of sodium dithionite were added and dissolved.

Into this mixture, 500 ml of methylene chloride and 1.0 g of p-tertbutylphenol were added and agitated. While maintaining the temperature at 15° C., 51 g of phosgene was bubbled into the reaction mixture over a period of 60 minutes.

After completing the phosgene addition, 10.6 g of a polysiloxane compound (Si6) having the following structure

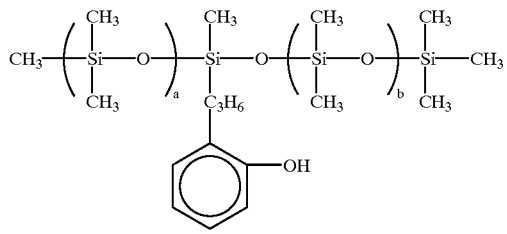

a+b≈39, average of 1.2 phenol groups per molecule and 2.6 g of diorganopolysiloxane (SC1) having the following structure

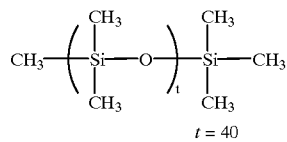

t = 40 were added to the reaction liquid and vigorously agitated to emulsify the reaction liquid. After the emulsification, 0.2 ml of triethylamine was added, and the mixture was agitated for about one hour and polymerized and blended.

The thus obtained polymerized resin liquid was separated into a water phase and an organic phase. The organic phase was neutralized with phosphoric acid, and water washing was repeated until the separating washed water became neutral. Then, the resin liquid was dropped into water warmed to 45° C., and the polymer was granulated while removing the solvent. The granulate was filtered and then dried to obtain a powdered polymer composition.

The composition had an intrinsic viscosity [η] of 0.69 dl/g in a methylene chloride solution at a concentration of 0.5 g/dl and at a temperature of 20° C.

The composition of the polymer thus obtained was analyzed by infrared absorption spectroscopy. As a result, absorption by a carbonyl group was observed at 1770 cm$^{-1}$, and absorption by an ether bond was observed at 1240 cm$^{-1}$, to thereby confirm the presence of a carbonate bond. Furthermore, at 3650–3200 cm$^{-1}$, absorption by hydrogen oxide was almost not observed, and a peak at 1100–1020 cm$^{-1}$ from siloxane was confirmed.

Furthermore, analysis by X-ray fluorescence (Cr globe) confirmed that the polymer contained silicon.

Thus, this composition was a mixture of a polycarbonate polymer having the following repeating units as main components and SC1.

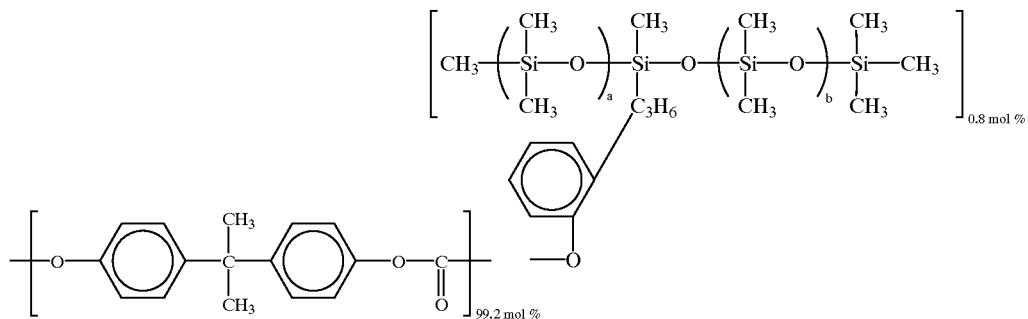

Example 9

The same procedures were conducted as in Example 8, except that 10.6 g of a polysiloxane compound (Si7) having the following structure

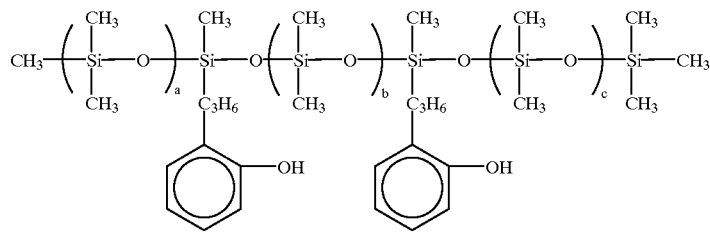

a+b+c≈38, average of 1.9 phenol groups per molecule was used as a main component instead of the Si6 polysiloxane compound, and the amount of the p-tert-buthyl phenol was changed to 2.0 g.

The composition thus obtained had an intrinsic viscosity [η] of 0.50 dl/g.

Analysis by infrared absorption spectroscopy and X-ray fluorescence confirmed that this composition was a mixture of a polycarbonate polymer having the following repeating units as main components and SC1.

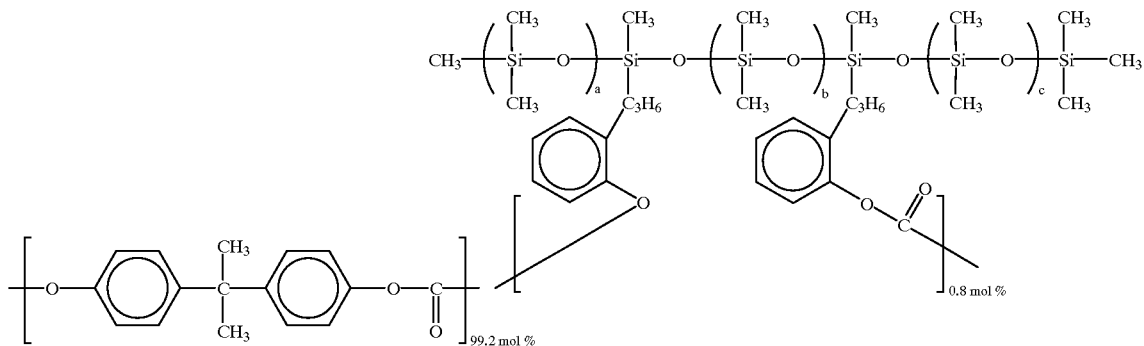

Example 10

The same procedures were conducted as in Example 8, except that 14.7 g of a polysiloxane compound (Si8) having as the following structure

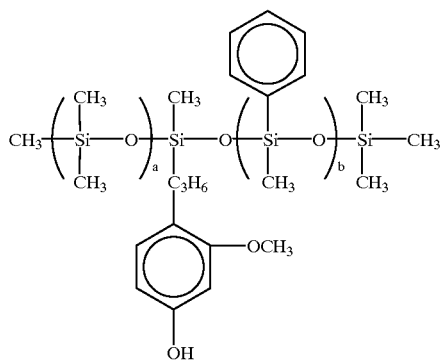

a≈20, b≈19, average of 1.1 phenol groups per molecule was used as a main component instead of the Si6 poxysiloxane compound and 3.7 g of a diorganopolysiloxane (SC2) having the following structure

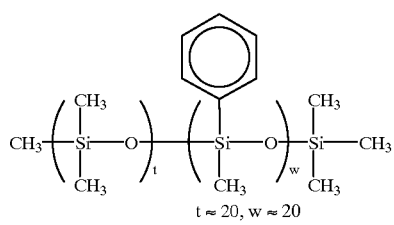

was used instead of the SC1 diorganopolysiloxane.

The composition thus obtained had an intrinsic viscosity [η] of 0.64 dl/g.

Analysis by infrared absorption spectroscopy and X-ray fluorescence confirmed that this composition was a mixture of a polycarbonate polymer having the following repeating units as main components and the SC2 diorganosiloxane.

Example 11

The same procedures were conducted as in Example 8, except that 18.8 g of a polysiloxane compound (Si9) having the following structure

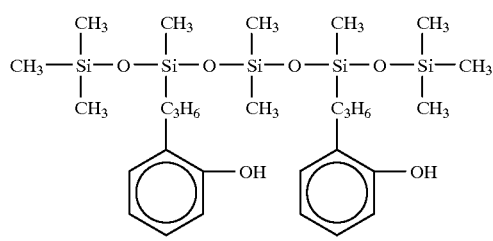

average of 1.8 phenol groups per molecule as a main component and 6.2 g of a diorganosiloxane having the following structure (SC3)

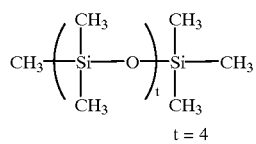

t = 4 were used. Also, the amount of phosgene was changed to 52 g, and the amount of p-tert-buthylphenol was changed to 0.1 g.

Thus composition thus obtained had an intrinsic viscosity [η] of 0.61 dl/g.

Analysis by infrared absorption spectroscopy and X-ray fluorescence confirmed that this composition was a mixture of a polycarbonate polymer having the following repeating units as main components and the SC3 diorganopolysiloxane.

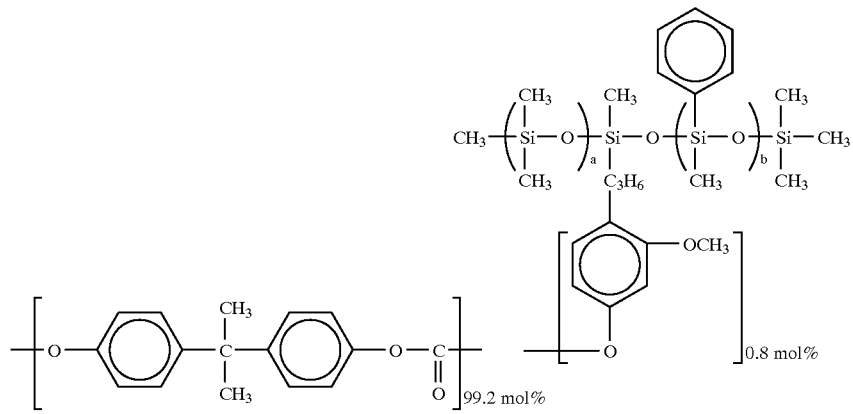

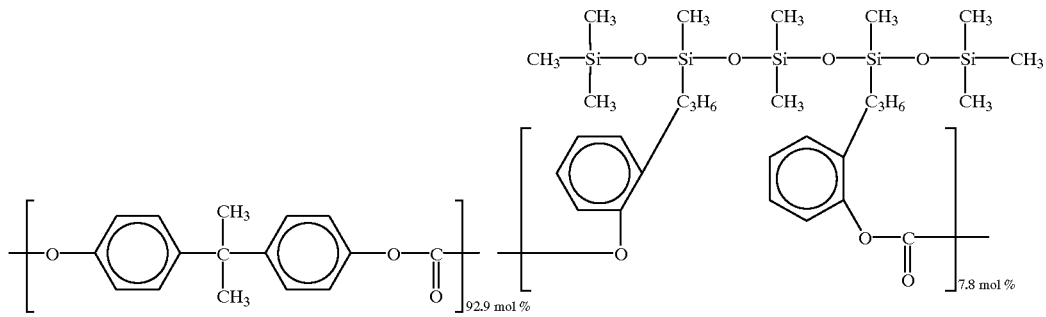

Example 12

The same procedures were conducted as in Example 8, except that 107.2 g of 1,1-bis(4-hydroxyphenyl)cyclohexane (BPZ) was used instead of BPA.

The composition thus obtained had an intrinsic viscosity [η] of 0.60 dl/g.

Analysis by infrared absorption spectroscopy and X-ray fluorescence confirmed that this composition was a mixture of a polycarbonate polymer having the following repeating units as main components and the SC1 diorganopolysiloxane.

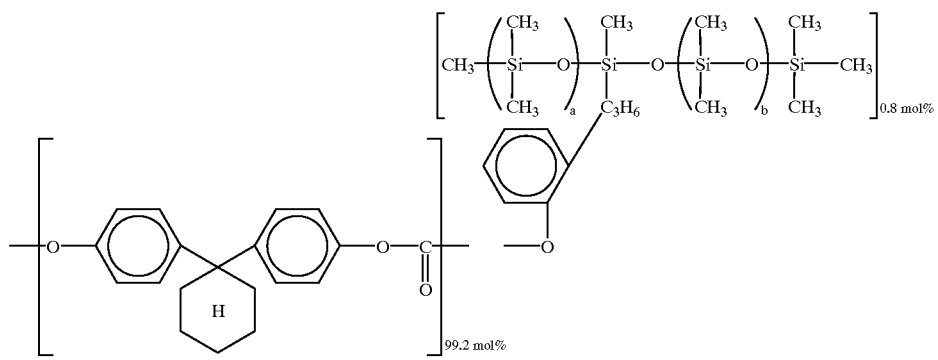

Example 13

The same procedures were conducted as in Example 8, except that 102.4 g of 2,2-bis(3-methyl-4-hydroxyphenyl)propane (DMBPA) was used instead of BPA, the amount of p-tertbutylphenol was changed to 2.8 g, and the amount of phosgene was changed to 53 g.

The composition thus obtained had an intrinsic viscosity [η] of 0.31 dl/g.

Analysis by infrared absorption spectroscopy and X-ray fluorescence confirmed that this polymer was a mixture of a polycarbonate polymer having the following repeating units as main components and the SC1 diorganopolysiloxane.

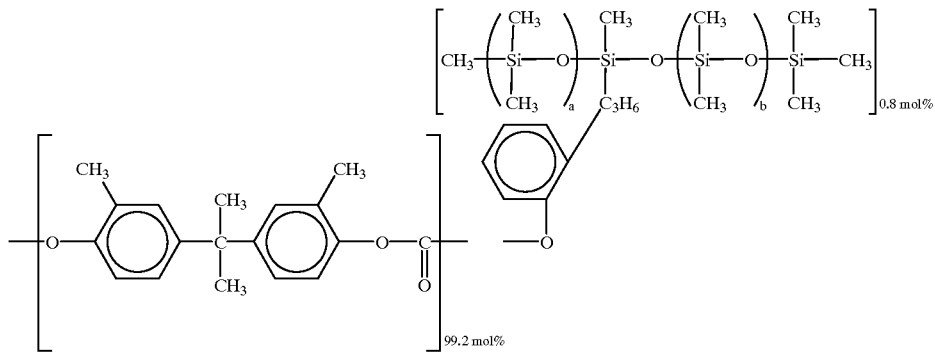

Example 14

The same procedures were conducted as in Example 8, except that 58 g of 1,1-bis(4-hydroxyphenyl)-1-phenylethane and 40.4 g of bis(4-hydroxyphenyl)ether (DHPE) were used instead of BPA.

The composition thus obtained had an intrinsic viscosity [η] of 0.67 dl/g.

Analysis by infrared absorption spectroscopy and X-ray fluorescence confirmed that this composition was a mixture of a polycarbonate polymer having the following repeating units as main components and the SC1 diorganopolysiloxane.

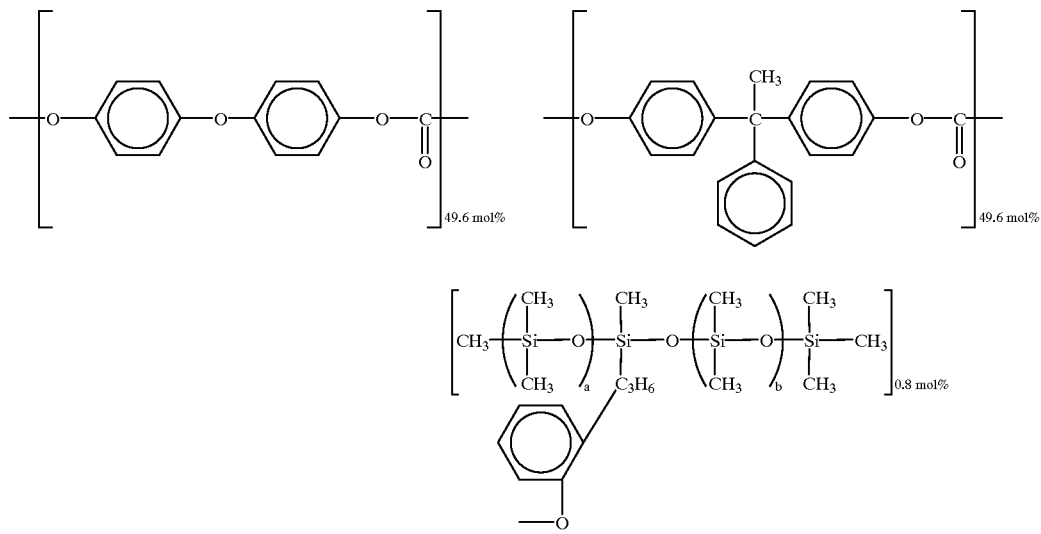

Example 15

The same procedures were conducted as in Example 8, except that 2.6 g of SC1 diorganopolysiloxane was added after polymerization was completed to a resin liquid obtained via phosphoric acid neutralization through the purification step but prior to forming a granulate.

The composition thus obtained had an intrinsic viscosity [η] of 0.62 dl/g.

Analysis by infrared absorption spectroscopy and X-ray fluorescence confirmed that this composition was a mixture of a polycarbonate polymer having the same repeating units as in Example 8 and the SC1 diorganopolysiloxane.

Example 16

The same procedures were conducted as in Example 8, except that the amount of the SC1 diorganopolysiloxane was changed to 13.2 g.

The composition thus obtained had an intrinsic viscosity [η] of 0.42 dl/g.

Analysis by infrared absorption spectroscopy and X-ray fluorescence confirmed that this composition was a mixture of a polycarbonate polymer having the same repeating units as in Example 8 and the SC1 diorganopolysiloxane.

Comparative Example 1

The same procedures were conducted as in Example 1, except that the polysiloxane compound of the Example 1 was not used.

The polymer thus obtained had an intrinsic viscosity [η] of 0.64 dl/g.

Analysis by infrared absorption spectroscopy and X-ray fluorescence confirmed that there was no siloxane structure, and the polymer was found to be a polycarbonate polymer having the following repeating unit.

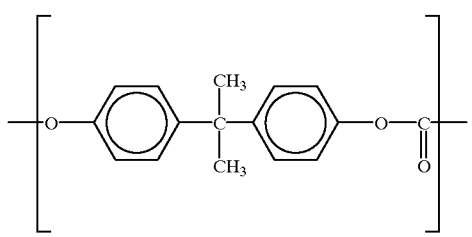

Comparative Example 2

The same procedures were conducted as in Example 1, except that 13.2 g of α,ω-bis[2-(p-hydroxyphenyl)ethyl]polydimethylsiloxane (Si5) represented by the following formula

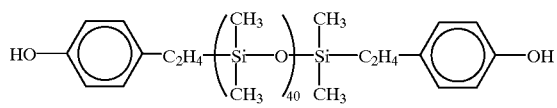

was used instead of the polysiloxane compound of Example 1.

The polymer thus obtained had an intrinsic viscosity [η] of 0.63 dl/g.

Analysis by infrared absorption spectroscopy and X-ray fluorescence confirmed that this polymer was a polycarbonate polymer having the following repeating units as main components.

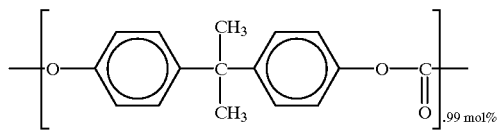

Comparative Example 3

To the polymer of Comparative Example 1, 13.2 g of the polysiloxane compound used in the Example 1 was added thereto and blended.

The blended substance thus obtained had an intrinsic viscosity [η] of 0.29 dl/g.

Comparative Example 4

The same procedures were conducted as in Example 8, except that the Si6 polysiloxane compound of Example 8 was not used.

The composition thus obtained had an intrinsic viscosity [η] of 0.63 dl/g.

Analysis by infrared absorption spectroscopy and X-ray fluorescence confirmed that this composition was a mixture of a polycarbonate polymer having the following repeating unit and the SC1 diorganopolysiloxane.

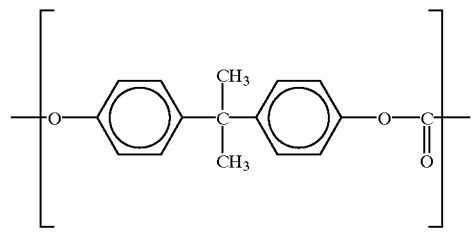

Comparative Example 5

The same procedures were conducted as in Example 8, except that 10.7 g of α,ω-bis[2-(p-hydroxyphenyl)ethyl]polydimethylsiloxane (Si5) represented by the following formula

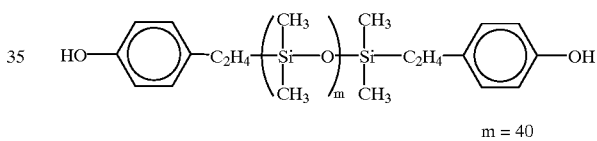

m = 40 was used instead of the polysiloxane compound Si6.

The composition thus obtained had an intrinsic viscosity [η] of 0.63 dl/g.

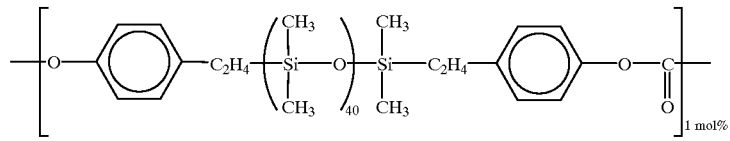

Analysis by infrared absorption spectroscopy and X-ray fluorescence confirmed that this compositione was a mixture of a polycarbonate polymer having the following repeating units as main components and the SC1 diorganopolysiloxane.

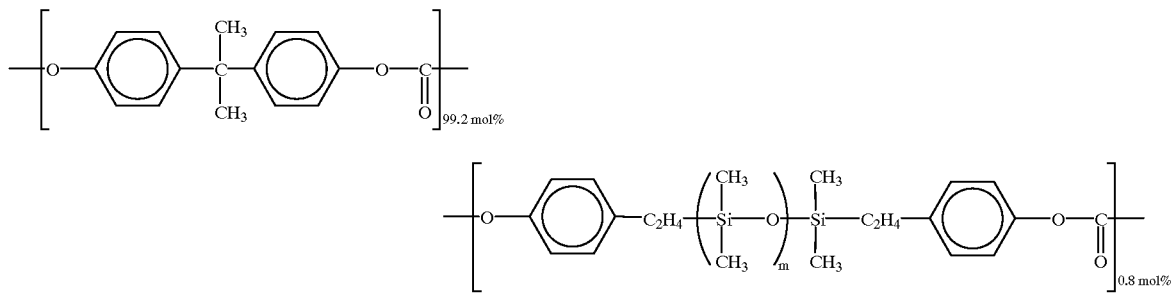

Comparative Example 6

The same procedures were conducted as in Comparative Example 4, except that 10.6 g of SC1 diorganopolysiloxane was added after polymerization was completed to a resin liquid obtained via phosphoric acid neutralization through the purification step but prior to forming a granulate.

The blended substance thus obtained had an intrinsic viscosity [η] of 0.26 dl/g.

The results of Examples 1–7 and Comparative Examples 1–3 are shown in Table 1, and the results of an abrasion test and transmittance shown in Table 2. Furthermore, an infrared absorption spectrum of the polymer obtained in Example 1 is shown in FIG. 1.

Figure 2:
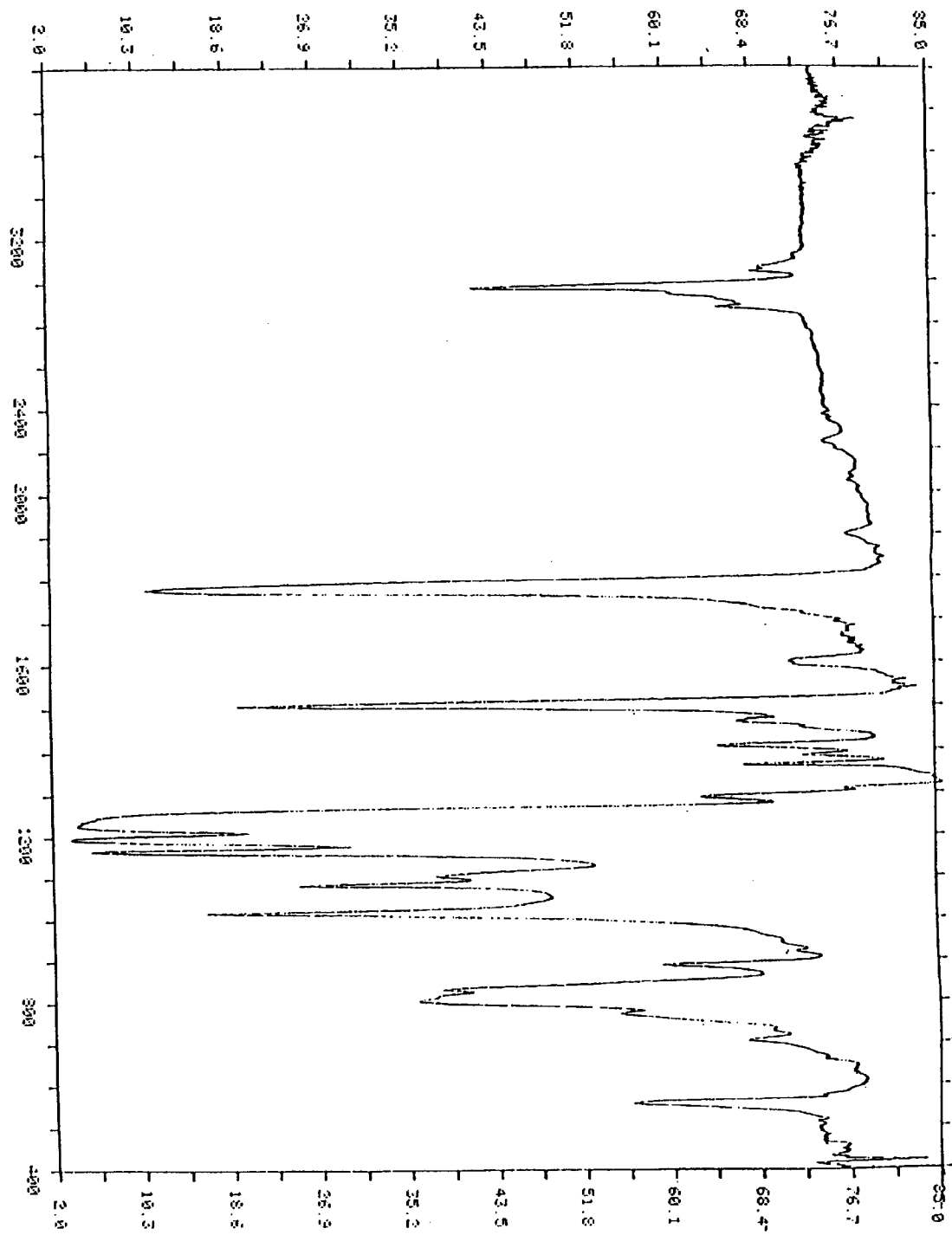
FIG. 2 shows an infrared absorption spectrum of the polymer obtained in Example 8.

The results of Examples 8–16 and Comparative Examples 4–6 are shown in Table 3, and the results of an abrasion test and transmission rate of a film prepared by wet forming the resin composition of Examples 8–16 and Comparative Examples 4–6 are shown in Table 4. Furthermore, an infrared absorption spectrum of the polymer obtained in Example 8 is shown in FIG. 2.

The following is an explanation of the abbreviations.

Si1: a polysiloxane compound of Example 1 having an average of 2 phenol groups per molecule and n=39.
Si2: a polysiloxane compound of Example 2 having an average of 2 phenol groups per molecule and n=39.
Si3: a polysiloxane compound of Example 3 having an average of 2 phenol groups per molecule and n=39.
Si4: a polysiloxane compound of Example 4 having an average of 2 phenol groups per molecule and n=3.
Si5: α,ω-bis[2-(p-hydroxyphenyl)ethyl]polydimethylsiloxane
Si6: a polysiloxane compound of Example 8 having an average of 1.2 phenol groups per molecule.
Si7: a polysiloxane compound of Example 9 having an average of 1.9 phenol groups per molecule.
Si8: a polysiloxane compound of Example 10 having an average of 1.1 phenol groups per molecule.
Si9: a polysiloxane compound of Example 11 having an average of 1.8 phenol groups per molecule.
SC1: dorganopolysiloxane used in Example 8, 9, 12, 13, 14, 15, 16 and Comparative Example 5 and 6.
SC2: diorganopolysiloxane used in Example 10.
SC3: diorganopolysiloxane used in Example 11.
BPA: 2,2-bis(4-hydroxyphenyl)propane
DMBPA: 2,2-bis(4-hydroxy-3-methylphenyl)propane
DHPE: bis(4-hydroxyphenyl)ether
BPAP: 1,1-bis(4-hydroxyphenyl)-1-phenylethane
Intrinsic Viscosity: measured at 20° C., in a 0.5 w/v % dichloromethane (methylene chloride) solution
SC content(%): diorganopolysiloxane/total resin composition×100=SC content (wt %)
Test Piece: A 250 μm cast film produced using a 20 w/v % dichloromethane solution. The surface is washed with methanol and then air-dried to provide a test piece.
Transmittance: measured using the Haze meter HM-100 (ASTM D-1003) made by Murakami Color Research Laboratory Co., Ltd. The transmission rate of all light rays was measured.
Abrasion Amount: amount of abrasion after 4, 12, 24 and 48 hours, using a Taber machine test (1000 g load, CS-17, in a toluene atmosphere)

TABLE 1

| | Raw Material | | | | | Intrinsic Viscosity |
|---|---|---|---|---|---|---|
| | Formula (A) | | | Formula (B) | | |
| | | mol (%) | wt (%) | | mol (%) | wt (%) | (dl/g) |
| Example 1 | Si1 | 1.0 | 12.6 | BPA | 99.0 | 87.4 | 0.89 |
| Example 2 | Si2 | 1.0 | 12.6 | BPA | 99.0 | 87.4 | 0.59 |
| Example 3 | Si3 | 1.0 | 16.8 | BPA | 99.0 | 83.2 | 0.85 |
| Example 4 | Si4 | 10.0 | 21.5 | BPA | 90.0 | 78.5 | 0.76 |
| Example 5 | Si1 | 1.0 | 11.0 | BPZ | 99.0 | 89.0 | 0.77 |
| Example 6 | Si1 | 1.0 | 11.4 | DMBPA | 99.0 | 88.6 | 0.30 |
| Example 7 | Si1 | 1.0 | 11.8 | DHPE + BPAP | 49.5 + 49.5 | 36.2 + 52.0 | 0.86 |
| Comparative Example 1 | — | 0.0 | 0.0 | BPA | 100 | 100 | 0.64 |
| Comparative Example 2 | Si5 | 1.0 | 12.6 | BPA | 99.0 | 87.4 | 0.63 |
| Comparative Example 3 | Si1 | 1.0 | 12.6 | BPA | 99.0 | 87.4 | 0.29 |

TABLE 2

| | Silicon (atom) Content (%) | Trans-mittance (%) | Abrasion Amount (mg) | | | |
|---|---|---|---|---|---|---|
| | | | 4 hr | 12 hr | 24 hr | 48 hr |
| Example 1 | 4.0 | 90.4 | 2 | 6 | 16 | 34 |
| Example 2 | 3.8 | 90.4 | 2 | 7 | 18 | 35 |
| Example 3 | 3.8 | 90.0 | 2 | 7 | 17 | 32 |
| Example 4 | 4.4 | 90.3 | 3 | 10 | 21 | 43 |
| Example 5 | 3.5 | 90.6 | 1 | 6 | 15 | 32 |
| Example 6 | 3.6 | 90.1 | 2 | 9 | 21 | 41 |
| Example 7 | 3.7 | 90.0 | 1 | 5 | 14 | 30 |
| Comparative Example 1 | 0.0 | 90.7 | 6 | 17 | 32 | 67 |
| Comparative Example 2 | 3.9 | 90.3 | 4 | 10 | 21 | 48 |
| Comparative Example 3 | 3.9 | 75.3 | 3 | 11 | 23 | 60 |

TABLE 3

| | Raw Material | | | | | | | |
|---|---|---|---|---|---|---|---|---|
| | Formula (A) | | | Formula (B) | | | SC | Intrinsic |
| | | mol (%) | wt (%) | | mol (%) | wt (%) | SC Content (%) | Viscosity (dl/g) |
| Example 8 | Si6 | 0.8 | 10.4 | BPA | 99.2 | 89.6 | SC1 | 2.2 | 0.69 |
| Example 9 | Si7 | 0.8 | 10.4 | BPA | 99.2 | 89.6 | SC1 | 2.2 | 0.50 |
| Example 10 | Si8 | 0.8 | 13.9 | BPA | 99.2 | 86.1 | SC2 | 3.1 | 0.64 |
| Example 11 | Si9 | 7.8 | 17.1 | BPA | 92.2 | 82.9 | SC3 | 4.9 | 0.61 |
| Example 12 | Si6 | 0.8 | 9.0 | BPZ | 99.2 | 91.0 | SC1 | 2.0 | 0.60 |
| Example 13 | Si6 | 0.8 | 9.4 | DMBPA | 99.2 | 90.6 | SC1 | 2.0 | 0.31 |
| Example 14 | Si6 | 0.8 | 9.7 | DHPE + BPAP | 49.6 + 49.6 | 37.1 + 53.2 | SC1 | 2.1 | 0.67 |
| Example 15 | Si6 | 0.8 | 10.4 | BPA | 99.2 | 89.6 | SC1 | 2.2 | 0.62 |
| Example 16 | Si6 | 0.8 | 10.4 | BPA | 99.2 | 89.6 | SC1 | 10.3 | 0.42 |
| Comparative Example 4 | — | 0.0 | 0.0 | BPA | 100 | 100 | SC1 | 2.5 | 0.63 |
| Comparative Example 5 | Si5 | 0.8 | 10.5 | BPA | 99.2 | 89.5 | SC1 | 2.2 | 0.63 |
| Comparative Example 6 | — | — | — | BPA | 100 | 100 | SC1 | 11.4 | 0.26 |

TABLE 4

| | Transmittance (%) | Amount of Abrasion (mg) | | | |
|---|---|---|---|---|---|
| | | 4 hr | 12 hr | 24 hr | 48 hr |
| Example 8 | 90.4 | 1 | 4 | 13 | 29 |
| Example 9 | 90.4 | 2 | 5 | 15 | 31 |
| Example 10 | 90.1 | 1 | 4 | 11 | 25 |
| Example 11 | 89.8 | 1 | 4 | 10 | 24 |
| Example 12 | 90.0 | 1 | 4 | 11 | 25 |
| Example 13 | 90.1 | 3 | 9 | 20 | 37 |
| Example 14 | 89.9 | 1 | 5 | 14 | 30 |
| Example 15 | 88.9 | 2 | 6 | 14 | 30 |
| Example 16 | 86.1 | 1 | 2 | 11 | 30 |
| Comparative Example 4 | 72.1 | 4 | 13 | 28 | 63 |
| Comparative Example 5 | 85.6 | 3 | 10 | 22 | 46 |
| Comparative Example 6 | 49.2 | 3 | 10 | 27 | 69 |

The polycarbonate resin composition of the present invention is a resin composition in which a novel polymer having a grafted siloxane structure and optionally an ordinary silicone (diorganopolysiloxane) are co-dissolved, and which provides a novel polycarbonate for molding materials and as a raw material for polymer alloys. The polycarbonate resin composition of the present invention has excellent transparency and abrasion resistance in comparison with a conventional siloxane co-polymerized polycarbonates or a diorganopolysiloxane-containing polycarbonate, and is applicable to a transparent molded article, such as a lens or a light cover where abrasion resistance is required. Furthermore, by using wet molding, a transparent molded article having a smooth surface and good slipping properties can be obtained. Moreover, the resin composition of the present invention is very appropriate for use as a functional film, such as an OHP film, etc.

While the invention has been described in detail and with reference to specific embodiments thereof, it will be apparent to one skilled in the art that various changes and modifications can be made therein without departing from the spirit and scope thereof.

What is claimed is:

1. A polycarbonate resin composition comprising a mixture of (i) a polycarbonate polymer obtained by reacting (a) a polysiloxane compound of formula (A):

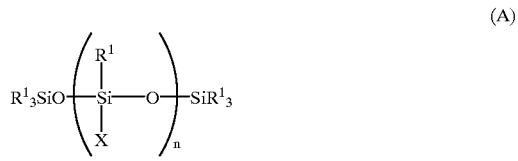

(A)

wherein $R^1$ each independently represents a group, which may have a substituent, selected from the group consisting of an alkyl group having 1 to 7 carbon atoms, an aryl group having 6 to 12 carbon atoms, an alkenyl group having 2 to 7 carbon atoms, an alkoxy group having 1 to 7 carbon atoms and an aralkyl group having 7 to 17 carbon atoms, X represents $R^1$ and/or an organic group (M) having a hydroxyphenyl group, the number of M groups per molecule is an average value of from 1 to 3, and n is an average value of from 2 to 1000; and (b) a bisphenol of formula (B):

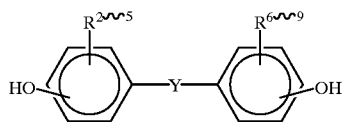
(B)

wherein $R^2$–$R^9$ each independently represents hydrogen, fluorine, chlorine, bromine, iodine and a group, which may have a substituent, selected from the group consisting of an alkyl group having 1 to 7 carbon atoms, an aryl group having 6 to 12 carbon atoms, an alkenyl group having 2 to 7 carbon atoms, an alkoxy group having 1 to 7 carbon atoms and an aralkyl group having 7 to 17 carbon atoms, and Y represents

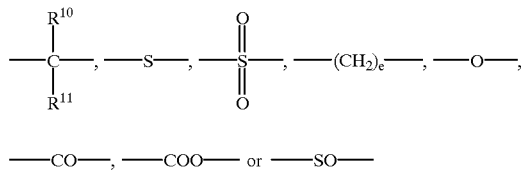

wherein $R^{10}$ and $R^{11}$ each independently represents hydrogen, a group, which may have a substituent, selected from the group consisting of an alkyl group having 1 to 7 carbon atoms, an alkenyl group having 2 to 7 carbon atoms, an alkoxy group having 1 to 7 carbon atoms and an aryl group having 6 to 12 carbon atoms, or $R^{10}$ and $R^{11}$ may combine to form a cyclic or a heterocyclic ring, and e represents an integer of from 0 to 20; with (c) a carbonate precursor, and (ii) from 0 to 20 wt % of a diorganopolysiloxane.

2. The resin composition according to claim 1, wherein the polysiloxane compound of formula (A) is added in an amount of from 0.01 to 20 mol % of the total amount of the polysiloxane compound of fromula (A) and the bisphenol compound of formula (B).

3. The resin composition according to claim 1, wherein the polycarbonate polymer has an intrinsic viscosity [η] of from 0.3 to 2.0 (dl/g).

4. The resin composition according to claim 1, wherein the bisphenol represented by formula (B) is selected from the group consisting of 2,2-bis(4-hydroxyphenyl)propane, 2,2-bis(4-hydroxyphenyl-3-methylphenyl)propane, 1,1-bis(4-hydroxyphenyl)cyclohexane, 1,1-bis(4-hydroxyphenyl)-1-phenylethane and bis(4-hydroxyphenyl)ether.

5. The resin composition according to claim 1, wherein the carbonate precursor comprises phosgene.

6. The resin composition according to claim 1, wherein $R^1$ in formula (A) is a methyl or phenyl group.

7. The resin composition according to claim 1, wherein the polymerization degree n is from 3 to 100.

8. The resin composition according to claim 1, wherein the diorganopolysiloxane comprises a liquid polydimethylsiloxane.

9. A film molded article formed by a wet molding method using the polycarbonate resin composition according to claim 1.

10. A method of preparing the polycarbonate resin composition according to claim 1, which comprises adding and mixing the diorganopolysiloxane during the polymerization reaction.

* * * * *